March 19, 1929.  A. HEWSON  1,706,062
BASKET
Filed Sept. 28, 1927
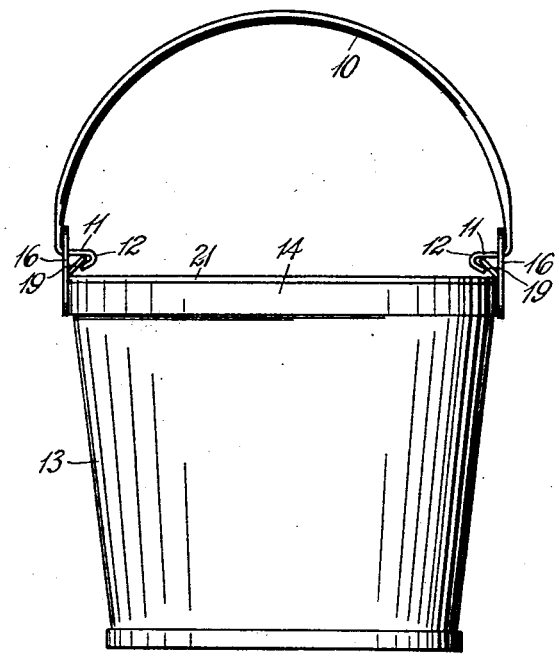
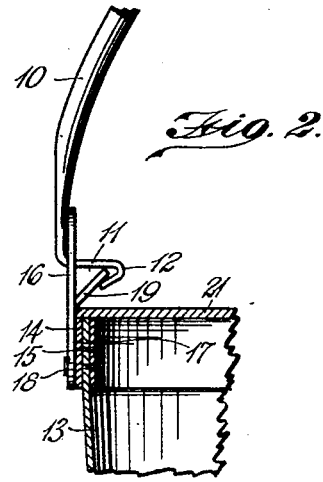
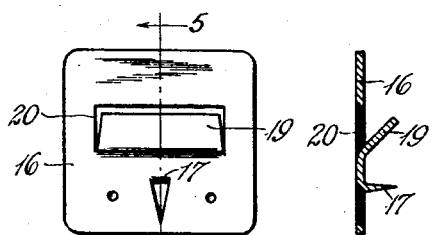
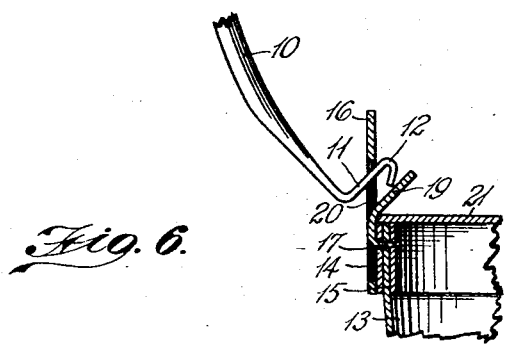
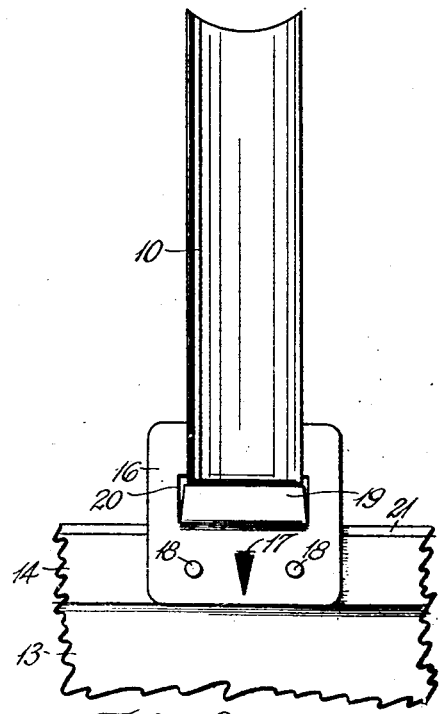
Inventor
ARTHUR HEWSON Patented Mar. 19, 1929.

1,706,062

UNITED STATES PATENT OFFICE.

ARTHUR HEWSON, OF GRIMSBY, ONTARIO, CANADA.

BASKET.

Application filed September 22, 1927. Serial No. 222,585.

This invention relates to improvements in attachable handles or bails for baskets and the like and consists of a metallic handle and complemental ears, the latter being secured to the sides of the basket, the ends of the handle being bent inwardly for passing through slots in the ears and then outwardly to form hooks for engaging locking projections on the inner sides of the ears.

The primary object of the invention is to provide a basket handle which may be readily and quickly applied to a basket and which when attached remains firm and securely in position.

Another object is to provide means combined with the handle to keep the basket cover securely in place.

A further object is to provide a device of the class specified which will be simple and inexpensive to manufacture.

These, together with other objects, may be attained by the construction, combination, and arrangement of the parts as will be hereinafter more particularly described, illustrated in the accompanying drawings, and ascertained in the claims hereunto annexed.

Referring to the drawing:

Figure 1 is an end elevation of a basket showing a handle constructed in accordance with this invention attached thereto;

Figure 2 is an enlarged detailed end view of one side of the handle and complemental ear showing the proximate portion of the basket in cross-section;

Figure 3 is a side view of the assembly characterized in Figure 2;

Figure 4 is a side elevation of one of the complemental ears as separate from the basket;

Figure 5 is a cross-sectional end elevation of the ear taken on the line 5—5 in Figure 4; and Figure 5 is an end elevation and cross-sectional view of the ear and proximate portion of the basket showing the handle in one stage in the process of attaching.

Similar reference numerals refer to corresponding parts throughout the several views.

The handle, designated on the drawing by the numeral 10, is preferably arcuate and formed of sheet metal so as to be somewhat flexible and capable of being sprung. In cross-section intermediate of its end parts the handle is rounded so as to comfortably conform to the contour of the hand and fingers of the carrier, but the end parts of the same are flat. The end parts of the handle are bent inwardly, the ends of these inturned portions 11 being further bent downwardly and outwardly to form the hooks 12.

On the drawing the basket wall is indicated by 13, the outer rim band by 14, and the inner rim band by 15. Permanently secured to these rims and basket wall at the sides of the basket midway of its ends are the metallic ears 16. These ears are preferably provided with prongs 17 which may be formed by cutting the material V shaped as shown, and bending the cut portion at right angles. These prongs are driven through the rim bands 14 and 15 and clinched against the inner surface of the inner band 15. The ears may be further secured by tacks or brads 18 also driven through said bands.

The portions of the ears 16 extending above the rim of the basket are provided with rectangular projections 19 extending upwardly and inwardly therefrom, and in the ears immediately above the bases of these projections rectangular slots 20 are formed. For the purpose of facilitating manufacture, the projections 19 may be cut from the material and bent to the position aforesaid, the slots 20 being formed by the said cut and bent out projections.

The inturned portions 11 of the handle are passed through the ear slots 20, and the hooks 12 engage the upper edge of the ear projections 19. In attaching the handle to the basket, the former is first tilted outwardly to bring the inturned portion 11 of one end on an angle parallel with the respective ear projection 19, as illustrated in Figure 6. In this position the said inturned portion together with its hook 12 may readily pass through the slot 20, and then by righting the handle the same is locked by means of the hook 12 engaging the ear projection 19.

The opposite end of the handle is attached by flexing the corresponding side of the basket inwardly to an angle approximately equivalent to the tilt of the handle when the same is being applied to the first side of the basket. Then by slightly flexing the handle itself the inturned portion thereof readily enters the ear slot and when passed through to its extremity and the pressure on the basket side released the hook snaps over the ear projection.

The handle is now firmly attached to the basket and a tension is maintained throughout the assembly.

The usual basket cover is indicated by 21, and it will be noted that this cover, which rests upon the rim of the basket, is disposed immediately beneath the bases of the ear projections 19. Thus the cover may be slightly flexed and slid along the top of the basket into proper position, and held in place by means of the said projections without further fastening means being required.

There has thus been produced a simple and useful device of the character described and for the purpose specified, and now having fully described the invention and the manner in which it is to be performed in such manner that any person skilled in the art to which it appertains could construct and use the same, I claim:—

In a device of the class described, in combination with a basket provided with ears on opposite sides thereof, said ears being provided with inward projections disposed above the rim of the basket and slots above the bases of said projections, an arcuate handle, inturned end portions on the handle for passage through said slots from the outer sides to the inner sides of the ears, and hooks on the ends of said inturned end portions extending downwardly and outwardly for tensionally engaging the under sides of said projections, substantially as shown and described.

In testimony whereof he has affixed his signature.

ARTHUR HEWSON.